US012498654B2

(12) United States Patent
Tanaka et al.

(10) Patent No.: US 12,498,654 B2
(45) Date of Patent: Dec. 16, 2025

(54) ENDLESS BELT, TRANSFER DEVICE, AND IMAGE FORMING APPARATUS

(71) Applicant: FUJIFILM Business Innovation Corp., Tokyo (JP)

(72) Inventors: Hiroaki Tanaka, Kanagawa (JP); Daisuke Tanemura, Kanagawa (JP); Masato Furukawa, Kanagawa (JP); Yosuke Kubo, Kanagawa (JP); Iori Nishimura, Kanagawa (JP); Masato Ono, Kanagawa (JP); Masayuki Seko, Kanagawa (JP); Shigeru Fukuda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 54 days.

(21) Appl. No.: 18/188,433

(22) Filed: Mar. 22, 2023

(65) Prior Publication Data

US 2024/0118646 A1 Apr. 11, 2024

(30) Foreign Application Priority Data

Sep. 27, 2022 (JP) ................................ 2022-154081

(51) Int. Cl.
*G03G 15/16* (2006.01)
*G03G 21/00* (2006.01)

(52) U.S. Cl.
CPC ......... *G03G 15/162* (2013.01); *G03G 15/161* (2013.01); *G03G 21/0011* (2013.01); *G03G 2215/1661* (2013.01)

(58) Field of Classification Search
CPC ............... G03G 15/162; G03G 15/161; G03G 21/0011; G03G 2215/1661
See application file for complete search history.

(56) References Cited

U.S. PATENT DOCUMENTS 5,778,295 A * 7/1998 Chen .................. G03G 15/2057 399/329
6,044,243 A * 3/2000 Hara .................... G03G 15/162 430/125.33
2002/0009314 A1* 1/2002 Nakayama ........... G03G 15/168 399/302
2012/0183330 A1* 7/2012 Uchida ................ G03G 15/162 525/101

(Continued)

FOREIGN PATENT DOCUMENTS

JP 2001042658 2/2001
JP 2002258633 9/2002
JP 2004182382 7/2004

*Primary Examiner* — Stephanie E Bloss
*Assistant Examiner* — Michael A Harrison
(74) *Attorney, Agent, or Firm* — JCIPRNET

(57) ABSTRACT

An endless belt, in which an outer peripheral surface of the endless belt has a coefficient of dynamic friction of 0.85 or less, and in a case where polyester resin particles having a volume-average particle size of 4.7 μm are caused to adhere to the outer peripheral surface under a load of 0 g/cm$^2$, and then air is sprayed on the outer peripheral surface from above the outer peripheral surface at a spray pressure that keeps increasing, all the polyester resin particles having adhered to the outer peripheral surface are spaced apart from the outer peripheral surface at the spray pressure of 6 kPa or less.

10 Claims, 3 Drawing Sheets

(56) References Cited

U.S. PATENT DOCUMENTS

| | | | | |
|---|---|---|---|---|
| 2015/0160588 | A1* | 6/2015 | Ito | G03G 15/1615 399/302 |
| 2015/0277301 | A1* | 10/2015 | Takazawa | G03G 15/0131 399/313 |

* cited by examiner

ENDLESS BELT, TRANSFER DEVICE, AND IMAGE FORMING APPARATUS

CROSS-REFERENCE TO RELATED APPLICATIONS

This application is based on and claims priority under 35 USC 119 from Japanese Patent Application No. 2022-154081 filed Sep. 27, 2022.

BACKGROUND

(i) Technical Field

The present invention relates to an endless belt, a transfer device, and an image forming apparatus.

(ii) Related Art

JP2001-042658A suggests "a conductive belt consisting of at least two layers, in which at least a surface layer between the two layers is formed of a macromolecular polymer composition having a siloxane bond, a water droplet contact angle on the surface layer is 90° or more, a coefficient of dynamic friction with urethane rubber is 0.1 or less, and a volume resistivity is $10^0$ to $10^{16}$ Ω·cm".

JP2002-258633A suggests "a transport device for transfer including an image holder that holds a toner image, an endless transport unit for transfer that supports a member and transfers the toner image on the image holder to the supported member, a cleaning unit that cleans the transport unit for transfer, a stretching unit on which the transport unit for transfer is hung under tension, and an application electrode that applies bias to the transport device for transfer, in which a maximum coefficient of static friction μsmax of a coefficient of static friction μs of an outermost layer of the transport unit for transfer is less than 0.79".

JP2004-182382A suggests "a transport belt used in an image forming apparatus or the like, in which a coefficient of static friction of the transport belt is 0.10 to 0.40".

SUMMARY

Aspects of non-limiting embodiments of the present disclosure relate to an endless belt that has higher transferability and higher cleanliness, compared to an endless belt with an outer peripheral surface having a coefficient of dynamic friction of more than 0.85, or compared to an endless belt with an outer peripheral surface from which all of polyester resin particles having adhered to the outer peripheral surface are spaced apart at a spray pressure more than 6 kPa in a case where the polyester resin particles having a volume-average particle size of 4.7 μm are caused to adhere to the outer peripheral surface under a load of 0 g/cm$^2$ and then air is sprayed on the outer peripheral surface from above the outer peripheral surface at the spray pressure that keeps increasing.

Aspects of non-limiting embodiments of the present disclosure also relate to an endless belt that has higher transferability and higher cleanliness, compared to an endless belt which has a layer containing a resin and silicone having a molecular weight less than 5,000 or more than 40,000, or compared to an endless belt in which an absolute value of a difference between an SP value of a resin and an SP value of silicone is less than 4 or more than 8. Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for achieving the above object include the following means.

According to an aspect of the present disclosure, there is provided an endless belt, in which an outer peripheral surface of the endless belt has a coefficient of dynamic friction of 0.85 or less, and in a case where polyester resin particles having a volume-average particle size of 4.7 μm are caused to adhere to the outer peripheral surface under a load of 0 g/cm$^2$, and then air is sprayed on the outer peripheral surface from above the outer peripheral surface at a spray pressure keeps increasing, all the polyester resin particles having adhered to the outer peripheral surface are spaced apart from the outer peripheral surface at the spray pressure of 6 kPa or less.

BRIEF DESCRIPTION OF THE DRAWINGS

Exemplary embodiment(s) of the present invention will be described in detail based on the following figures, wherein.

DETAILED DESCRIPTION

Figure 1:
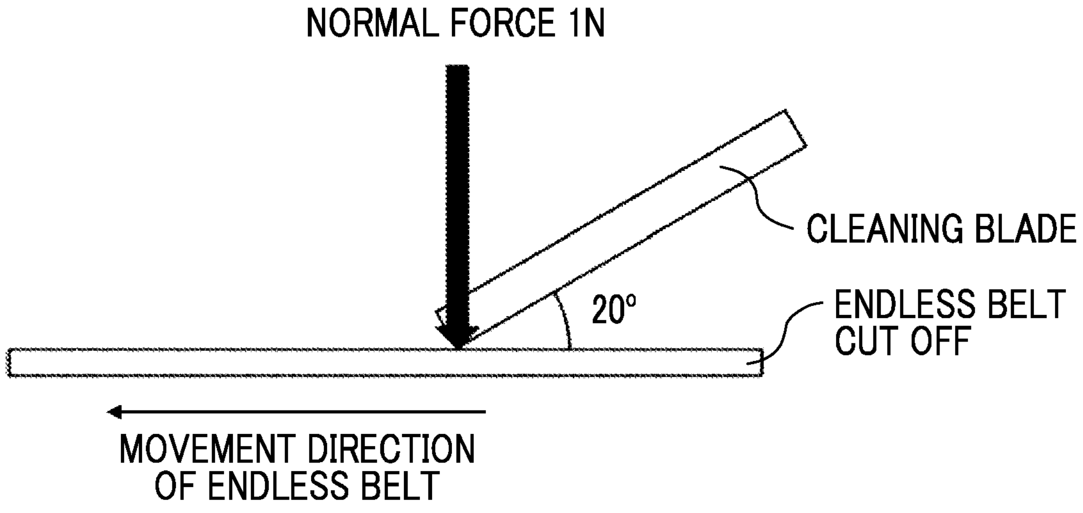
FIG. 1 is a schematic view illustrating a method of measuring a coefficient of dynamic friction of an outer peripheral surface of an endless belt.

The exemplary embodiments as an example of the present invention will be described below. The following descriptions and examples merely illustrate the exemplary embodiments, and do not limit the scope of the invention.

Regarding the ranges of numerical values described in stages in the present specification, the upper limit or lower limit of a range of numerical values may be replaced with the upper limit or lower limit of another range of numerical values described in stages. Furthermore, in the present specification, the upper limit or lower limit of a range of numerical values may be replaced with values described in examples.

Each component may include a plurality of corresponding substances.

In a case where the amount of each component in a composition is mentioned, and there are two or more substances corresponding to each component in the composition, unless otherwise specified, the amount of each component means the total amount of two or more substances present in the composition.

Endless Belt

The endless belt according to a first exemplary embodiment has an outer peripheral surface having a coefficient of dynamic friction of 0.85 or less, in which in a case where polyester resin particles having a volume-average particle size of 4.7 μm are caused to adhere to the outer peripheral surface under a load of 0 g/cm$^2$, and then air is sprayed on the outer peripheral surface from above the outer peripheral surface at a spray pressure that keeps increasing, all the polyester resin particles having adhered to the outer peripheral surface are spaced apart from the outer peripheral surface at the spray pressure of 6 kPa or less.

Due to the above configuration, the endless belt according to the first exemplary embodiment has excellent transferability and excellent cleanliness. The reason is presumed as follows.

In the related art, the outer peripheral surface of an intermediate transfer member has a high coefficient of dynamic friction, which sometimes leads to strong adhesion of a toner. Therefore, in a case where the setting of an image forming apparatus or the like is adjusted to improve the transferability to a recording medium, the amount of a toner remaining on a cleaning blade is reduced, which is likely to deteriorate the action of reducing the friction between the intermediate transfer member and the cleaning blade. In this case, the intermediate transfer member with the outer peripheral surface having a high coefficient of dynamic friction and the cleaning blade come into contact with each other, which sometimes leads to cleaning failure, acceleration of cleaning blade deterioration, and the like.

In the endless belt according to the first exemplary embodiment, the outer peripheral surface of the endless belt has a coefficient of dynamic friction of 0.85 or less, and all the polyester resin particles having adhered to the outer peripheral surface are spaced apart from the outer peripheral surface at the spray pressure of 6 kPa or less. In a case where the endless belt according to the first exemplary embodiment is used as an intermediate transfer member, the transferability is improved, and the friction between the intermediate transfer member and the cleaning blade is reduced even though the amount of a toner remaining on the cleaning blade is reduced. As a result, the posture of the cleaning blade is maintained, and excellent cleanliness is achieved.

Presumably, for the above reasons, the endless belt according to the first exemplary embodiment may have excellent transferability and excellent cleanliness.

The endless belt according to a second exemplary embodiment has a layer containing a resin and silicone having a molecular weight of 5,000 or more and 40,000 or less, and an absolute value of a difference between an SP value of the resin and an SP value of the silicone is 4 or more and 8 or less.

Due to the above configuration, the endless belt according to the second exemplary embodiment has excellent transferability and excellent cleanliness. The reason is presumed as follows.

The endless belt according to the second exemplary embodiment has a layer containing a resin and silicone having a molecular weight of 5,000 or more and 40,000 or less. The silicone having a molecular weight within the above range has a function of lowering surface free energy. Therefore, the coefficient of dynamic friction of the outer peripheral surface of the endless belt is reduced, and the adhesion of a toner is also suppressed.

Furthermore, because the absolute value of the difference between the SP value of the resin and the SP value of the silicone is 4 or more and 8 or less, the resin and the silicone are likely to be excellently mixed together.

Presumably, for the above reasons, the endless belt according to the second exemplary embodiment may have excellent transferability and excellent cleanliness.

Hereinafter, an endless belt corresponding to both the first exemplary embodiment and second exemplary embodiment (hereinafter, called "endless belt according to the present exemplary embodiment") will be specifically described. Here, an example of the endless belt of the present invention may be an endless belt corresponding to any one of the endless belts according to the first exemplary embodiment or the second exemplary embodiment.

Coefficient of Dynamic Friction

The outer peripheral surface of the endless belt according to the present exemplary embodiment has a coefficient of dynamic friction of 0.85 or less.

From the viewpoint of transferability and cleanliness, the coefficient of dynamic friction of the outer peripheral surface is, for example, preferably 0.1 or more and 0.85 or less, more preferably 0.1 or more and 0.5 or less, and even more preferably 0.3 or more and 0.5 or less.

Procedure of Measuring Coefficient of Dynamic Friction of Outer Peripheral Surface of Endless Belt The coefficient of dynamic friction of the outer peripheral surface is measured by the following procedure.

The endless belt is cut off and placed on a table of a frictional force measuring device, with the outer peripheral surface facing up. A cleaning blade (made of urethane rubber, hardness 79°, modulus of repulsion elasticity 28%, length 10 mm×width 20 mm×thickness 2.0 mm) is placed on the outer peripheral surface of the endless belt such that the cleaning blade comes into contact with the endless belt in a direction parallel to the width direction of the endless belt while forming an angle of 20° with the endless belt. A normal force 1N is applied to a contact portion between the endless belt and the cleaning blade. The endless belt is moved from the vicinity of one end to the vicinity of the other end of the endless belt at a speed of 100 mm/s, in a direction opposite to the direction along which the endless belt enters beneath the cleaning blade. The movement direction of the endless belt on the table of the frictional force measuring device is opposite to the rotation direction of the endless belt in the image forming apparatus. The endless belt is moved, the dynamic frictional force with the cleaning blade is measured, and the coefficient of dynamic friction is determined. The measurement is performed at a temperature of 22° C. and a relative humidity of 55%. FIG. 1 is a schematic view showing the measurement method.

Adhesion Characteristics

In a case where polyester resin particles having a volume-average particle size of 4.7 μm are caused to adhere to the outer peripheral surface of the endless belt according to the present exemplary embodiment under a load of 0 $g/cm^2$, and then air is sprayed on the outer peripheral surface from above the outer peripheral surface at a spray pressure that keeps increasing, all the polyester resin particles having adhered to the outer peripheral surface are spaced apart from the outer peripheral surface at the spray pressure of 6 kPa or less (hereinafter, this aspect will be called "adhesion characteristics").

From the viewpoint of transferability and cleanliness, the spray pressure is, for example, preferably 8 kPa or less, more preferably 7 kPa or less, and even more preferably 6 kPa or less.

Whether or not the adhesion characteristics are satisfied is determined as follows.

First, from a target endless belt, a quadrangle sample piece having a size 3 cm×4 cm is collected.

Then, in an environment at 22° C. and 15% RH, a voltage of 10 kV is applied to a surface of the sample piece, the surface corresponding to the outer peripheral surface of the endless belt, from 15 cm above the surface in a direction parallel to the surface corresponding to the outer peripheral surface of the endless belt. In this state, polyester resin particles are scattered on the aforementioned surface and caused to adhere to the surface in an application amount of 3 $g/cm^2$. The polyester resin particles are scattered from 10 cm above the surface corresponding to the outer peripheral surface of the endless belt such that the polyester resin particles free-fall by the weight thereof. The polyester resin particles are caused to adhere to the surface corresponding to the outer peripheral surface of the endless belt, under a load of 0 g/$cm^2$.

The polyester resin particles are polycondensates of dimethyl fumarate as a dicarboxylic acid and propylene glycol as a dialcohol. As the polyester resin particles, resin particles having a weight-average molecular weight of 25,000 and a volume-average particle size of 4.7 μm are used.

As the polyester resin particles, resin particles are adopted which substantially do not come into frictional contact with each other or with other members (such as a carrier) and substantially do not experience triboelectrification. Specifically, as the polyester resin particles, resin particles are adopted which have been stored for half a year in an environment at a temperature of 10° C. or higher and 22° C. or lower and a humidity of 10% RH or higher and 55% RH or lower after being manufactured.

Next, from an air spray port having a diameter of 0.7 mm placed 3 cm above the central portion of the surface of the sample piece to which the polyester resin particles have adhered, air starts to be sprayed on the central portion at a spray pressure of 0.1 kPa, and the spray pressure is increased at 0.5 kPa/sec.

In a case where all the polyester resin particles are spaced apart from the sample piece at a point in time when the spray pressure has reached 6 kPa, it is determined that the adhesion characteristics are satisfied.

On the other hand, in a case where the polyester resin particles remain on the sample piece even though the spray pressure exceeds 6 kPa, it is determined that the adhesion characteristics are unsatisfied.

The weight-average molecular weight of the polyester resin particles is measured by gel permeation chromatography (GPC). By GPC, the molecular weight is measured using GPC·HLC-8120GPC manufactured by Tosoh Corporation as a measurement device, TSKgel·Super HM-M (15 cm) manufactured by Tosoh Corporation as a column, and THF as a solvent. The weight-average molecular weight and the number-average molecular weight are calculated using a molecular weight calibration curve plotted using a monodisperse polystyrene standard sample from the measurement results.

The volume-average particle size of the polyester resin particles is measured using COULTER MULTISIZER II (manufactured by Beckman Coulter Inc.) and using ISOTON-II (manufactured by Beckman Coulter Inc.) as an electrolytic solution.

For measurement, a measurement sample in an amount of 0.5 mg or more and 50 mg or less is added to 2 ml of a 5% aqueous solution of a surfactant (preferably sodium alkylbenzene sulfonate, for example) as a dispersant. The obtained solution is added to an electrolytic solution in a volume of 100 ml or more and 150 ml or less.

The electrolytic solution in which the sample is suspended is subjected to a dispersion treatment for 1 minute with an ultrasonic disperser, and the particle size distribution of particles having a particle size in a range of 2 μm or more and 60 μm or less is measured using COULTER MULTISIZER II with an aperture having an aperture size of 100 μm. The number of particles to be sampled is 4,000.

For the particle size ranges (channels) divided based on the measured particle size distribution, a cumulative volume distribution is drawn from small-sized particles. The particle size at which the cumulative percentage of the particles reaches 50% is defined as a volume-average particle size D50v.

Composition and Layer Configuration

It is preferable that the endless belt according to the present exemplary embodiment have, for example, a layer containing a resin and silicone having a molecular weight of 5,000 or more and 40,000 or less (hereinafter, also called "specific silicone").

Resin

Examples of the resin include a polyimide resin (PI resin), a polyamide-imide resin (PAI resin), an aromatic polyether ketone resin (for example, an aromatic polyether ether ketone resin or the like), a polyphenylene sulfide resin (PPS resin), and a polyetherimide resin (PEI resin), a polyester resin, a polyamide resin, a polycarbonate resin, and the like. From the viewpoint of mechanical strength and compatibility with silicone, for example, the resin preferably includes at least one resin selected from the group consisting of an imide-based resin (at least one resin selected from a polyimide resin and a polyamide-imide resin), an aromatic polyether ether ketone resin, a polyetherimide resin, and a polyphenylene sulfide resin, and more preferably includes at least one resin selected from the group consisting of a polyimide resin and a polyamide-imide resin. Among these, from the viewpoint of mechanical strength and compatibility with silicone, for example, an imide-based resin is even more preferable. The resin may consist of one resin or may be a mixture of two or more resins.

Polyimide Resin

Examples of the polyimide resin include an imidized polyamic acid (polyimide precursor) which is a polymer of a tetracarboxylic acid dianhydride and a diamine compound.

Examples of the polyimide resin include a resin having a constitutional unit represented by General Formula (I).

General Formula (I)

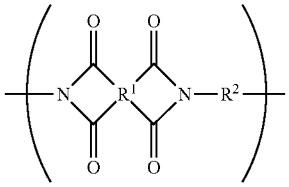

In General Formula (I), $R^1$ represents a tetravalent organic group, and $R^2$ represents a divalent organic group.

Examples of the tetravalent organic group represented by $R^1$ include an aromatic group, an aliphatic group, a cyclic aliphatic group, a group obtained by combining an aromatic group and an aliphatic group, and a group obtained by the substitution of these. Specific examples of the tetravalent organic group include a residue of a tetracarboxylic acid dianhydride which will be described later.

Examples of the divalent organic group represented by $R^2$ include an aromatic group, an aliphatic group, a cyclic aliphatic group, a group obtained by combining an aromatic group and an aliphatic group, and a group obtained by the substitution of these. Specific examples of the divalent organic group include a residue of a diamine compound which will be described later.

Specifically, examples of the tetracarboxylic acid dianhydride used as a raw material of the polyimide resin include a pyromellitic acid dianhydride, a 3,3',4,4'-benzophenone tetracarboxylic acid dianhydride, a 3,3',4,4'-biphenyltetracarboxylic acid dianhydride, a 2,3,3',4-biphenyltetracarboxylic acid dianhydride, a 2,3,6,7-naphthalenetetracarboxylic acid dianhydride, a 1,2,5,6-naphthalenetetracarboxylic acid dianhydride, a 1,4,5,8-naphthalenetetracarboxylic acid dianhydride, a 2,2'-bis(3,4-dicarboxyphenyl)sulfonic acid dianhydride, a perylene-3,4,9,10-Tetracarboxylic acid dianhydride, a bis(3,4-dicarboxyphenyl)ether dianhydride, and an ethylenetetracarboxylic acid dianhydride.

Specific examples of the diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenylsulfide, 3,3'-diaminodiphenylsulfone, 1,5-diaminonaphthalene, m-phenylenediamine, p-phenylenediamine, 3,3'-dimethyl 4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino tert-butyl)toluene, bis(p-β-amino-tert-butylphenyl)ether, bis(p-β-methyl-δ-aminophenyl) benzene, bis-p-(1,1-dimethyl-5-amino-pentyl) benzene, 1-isopropyl-2,4-m-phenylenediamine, m-xylylene diamine, p-xylylene diamine, di(p-aminocyclohexyl)methane, hexamethylenediamine, heptamethylenediamine, octamethylenediamine, nonamethylenediamine, decamethylenediamine, diaminopropyltetramethylenediamine, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, $H_2N(CH_2)_3N(CH_3)_2(CH_2)_3NH_2$, and the like.

Polyamide-Imide Resin

Examples of the polyamide-imide resin include a resin having an imide bond and an amide bond in a repeating unit.

More specifically, examples of the polyamide-imide resin include a polymer of a trivalent carboxylic acid compound (also called a tricarboxylic acid) having an acid anhydride group and a diisocyanate compound or a diamine compound.

As the tricarboxylic acid, for example, a trimellitic acid anhydride and a derivative thereof preferable. In addition to the tricarboxylic acid, a tetracarboxylic acid dianhydride, an aliphatic dicarboxylic acid, an aromatic dicarboxylic acid, or the like may also be used.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

Examples of the diamine compound include a compound that has the same structure as the aforementioned isocyanate and has an amino group instead of an isocyanato group.

Specific Silicone

Examples of the specific silicone include a compound having two or more siloxane bonds (Si—O—Si).

Examples of the specific silicone include silicone oils such as dimethylpolysiloxane, diphenylpolysiloxane, and phenylmethylpolysiloxane; modified silicone oils such as polyether-modified polysiloxane, amino-modified polysiloxane, epoxy-modified polysiloxane, carboxyl-modified polysiloxane, carbinol-modified polysiloxane, fluorine-modified polysiloxane, methacryl-modified polysiloxane, mercapto-modified polysiloxane, phenol-modified polysiloxane, and polyester resin-modified polysiloxane; and the like.

The polyether-modified polysiloxane is silicone having a polyether group (that is, an atomic group having two or more ether bonds).

From the viewpoint of compatibility with the resin, the specific silicone is, for example, preferably polyether-modified polysiloxane.

The specific silicone has a molecular weight of 5,000 or more and 40,000 or less.

In a case where the molecular weight of the specific silicone is 5,000 or more, the function of reducing surface free energy is further enhanced. In a case where the molecular weight of the specific silicone is 40,000 or less, compatibility with the resin can be ensured.

From the viewpoint of transferability and cleanliness, the molecular weight of the specific silicone is, for example, preferably 7,000 or more and 40,000 or less, more preferably 10,000 or more and 40,000 or less, and even more preferably 12,000 or more and 40,000 or less.

Hereinafter, the procedure of measuring the molecular weight of the specific silicone will be described.

The molecular weight of the specific silicone is calculated from viscosity. The viscosity is calculated from the Eyring-Flory equation reported by Barry (A. J. Barry, J. Appl. Phys., 17, 1020 (1946)). Assuming that the dynamic viscosity of the specific silicone at 25° C. is $\eta$ (cSt) and the molecular weight of the specific silicone is M, the molecular weight of the specific silicone can be derived from the relationship of $\log \eta = 1.00 + 1.23 \times 0.01 \times \sqrt{M}$.

The content of the specific silicone with respect to the total mass of the layer containing a resin and the specific silicone is, for example, preferably 1.0% by mass or more, more preferably 1.5% by mass or more and 3.0% by mass or less, and even more preferably 2.5% by mass or more and 3.0% by mass or less.

In a case where the content of the specific silicone is 1.0% by mass or more with respect to the total mass of the layer containing a resin and the specific silicone, the content of the specific silicone in the layer containing a resin and the specific silicone is enough for the specific silicone to sufficiently exhibit the effect of reducing surface free energy.

Relationship Between Resin and Specific Silicone

The absolute value of a difference between an SP value of a resin and an SP value of the specific silicone is 4 or more and 8 or less.

From the viewpoint of transferability and cleanliness, the absolute value of the difference between the SP value of the resin and the SP value of the specific silicone is, for example, preferably 5 or more and 8 or less, more preferably 7 or more and 8 or less, and even more preferably 7.5 or more and 8 or less.

The solubility parameter (SP value) of the resin and the specific silicone is a value calculated by the Fedors method (Polym. Eng. Sci., 14, 147 (1974)).

In order that the absolute value of the difference between the SP value of the resin and the SP value of the specific silicone is 4 or more and 8 or less, for example, it is preferable to adopt a combination of an imide-based resin as the resin and polyether-modified polysiloxane as the specific silicone.

In a case where the aforementioned combination of a resin and the specific silicone is adopted, the compatibility between the resin and the specific silicone is improved, and the specific silicone more effectively reduces surface free energy.

Conductive Particles

The layer containing a resin and the specific silicone may contain conductive particles.

Examples of the conductive particles include at least one kind of particles selected from the group consisting of conductive carbon particles and metal oxide particles.

The conductive particles preferably include, for example, conductive carbon particles among the above.

Examples of the conductive carbon particles include carbon black.

Examples of the carbon black include Ketjen black, oil furnace black, channel black, and acetylene black. As the carbon black, carbon black having undergone a surface treatment (hereinafter, also called "surface-treated carbon black") may be used.

The surface-treated carbon black is obtained by adding, for example, a carboxy group, a quinone group, a lactone group, or a hydroxy group to the surface of carbon black. Examples of the surface treatment method include an air oxidation method of reacting carbon black by bringing the carbon black into contact with air in a high temperature atmosphere, a method of reacting carbon black with nitrogen oxide or ozone at room temperature (for example, 22° C.), and a method of oxidizing carbon black with air in a high temperature atmosphere and then with ozone at a low temperature.

Examples of the metal oxide particles include tin oxide particles, titanium oxide particles, zinc oxide particles, zirconium oxide particles, and the like.

Examples of the conductive particles include metal particles (for example, aluminum particles, nickel particles, and the like), ionic conductive particles (for example, potassium titanate particles, LiCl particles, and the like), and the like.

The content of the conductive particles is, for example, preferably 10% by mass or more and 30% by mass or less with respect to the total mass of the layer containing a resin and the specific silicone.

Other Components

The layer containing a resin and the specific silicone may contain other components in addition to the resin, the specific silicone, and the conductive particles.

Examples of the other components include a conductive material other than conductive particles, a filler for improving strength of the belt, an antioxidant for preventing thermal deterioration of a belt, a surfactant for improving fluidity, a heat-resistant antioxidant, and the like.

In a case where the layer contains the other components, the content of the other components with respect to the total mass of the layer containing a resin and the specific silicone is, for example, preferably more than 0% by mass and 10% by mass or less, more preferably more than 0% by mass and 5% by mass or less, and even more preferably more than 0% by mass and 1% by mass or less.

The endless belt may be a single layer body or a laminate.

In a case where the endless belt is a laminate, the layer containing a resin and the specific silicone configures the outer peripheral surface.

In a case where the endless belt is a laminate, layers other than the layer containing a resin and the specific silicone are not particularly limited, and examples thereof include a layer containing a resin.

Examples of the resin contained in the layer other than the layer containing a resin and the specific silicone include an imide-based resin.

Thickness of Endless Belt

In a case where the endless belt is a single layer, from the viewpoint of mechanical strength of the belt, the thickness of the endless belt is, for example, preferably 60 μm or more and 120 μm or less, and more preferably 80 μm or more and 120 μm or less.

In a case where the endless belt is a laminate, the thickness of the layer containing a resin and the specific silicone is, for example, preferably 60 μm or more and 120 μm or less, and more preferably 80 μm or more and 120 μm or less.

In a case where the endless belt is a laminate, the total thickness of the endless belt is, for example, preferably 70 μm or more and 130 μm or less, and more preferably 90 μm or more and 130 μm or less.

The thickness of the endless belt and the thickness of each layer are measured as follows.

That is, a cross section of the endless belt taken along the thickness direction is observed with an optical microscope or a scanning electron microscope, the thickness of the endless belt as a measurement target or the thickness of each layer is measured at 10 sites, and the average thereof is adopted as the thickness.

Manufacturing Method of Endless Belt

It is preferable that the endless belt according to the present exemplary embodiment be obtained, for example, by coating a coating target with a coating liquid for forming an endless belt, and then performing drying and baking.

It is preferable that the coating liquid contain, for example, a resin or a resin precursor, the specific silicone, and a solvent. As necessary, the coating liquid may contain conductive particles and other components.

Hereinafter, as an example of the manufacturing method of the endless belt, a manufacturing method of an endless belt will be described in which the layer containing a resin and the specific silicone contains a polyimide resin as a resin.

The manufacturing method of an endless belt includes, for example, a step of coating a cylindrical substrate (mold) with a polyimide precursor composition to form a coating film (coating film forming step), a step of drying the coating film formed on the substrate to form a dry film (drying step), a step of performing an imidization treatment (heating treatment) on the dry film to imidize a polyimide precursor and form a molded article of a polyimide resin (baking step), and a step of removing the molded article of the polyimide resin from the substrate to obtain an endless belt (removing step). The molded article of the polyimide resin is the layer containing a resin and the specific silicone. Specifically, for example, the manufacturing method is performed as below.

Note that the polyimide precursor composition is as explained in "Polyimide precursor composition" that will be described later.

First, the inner surface or outer surface of a cylindrical substrate is coated with the polyimide precursor composition to form a coating film. As the cylindrical substrate, for example, a cylindrical metal substrate is preferably used. Instead of the metal substrate, substrates made of other materials such as a resin, glass, and ceramics may also be used. Furthermore, a glass coat, a ceramic coat, or the like may be provided on the surface of the substrate, or the substrate may be coated with a silicone-based or fluorine-based release agent.

In order to coat the substrate with the polyimide precursor composition with high accuracy, for example, it is preferable to perform a step of defoaming the polyimide precursor composition before coating. Defoaming of the polyimide precursor composition suppresses the occurrence of foaming during coating and the occurrence of defects in the coating film.

Examples of the method of defoaming the polyimide precursor composition include a method of putting the composition in a pressure-reduced state, a method of performing centrifugation, and the like. Among these, the method of putting the composition in a pressure-reduced state is appropriate because such a method is simple and highly capable of defoaming the composition.

Next, the cylindrical substrate on which the coating film of the polyimide precursor composition is formed is placed in a heating or vacuum environment, and the coating film is dried to form a dry film. 30% by mass or more, for example, preferably 50% by mass or more of the solvent contained in the coating film is volatilized.

Then, an imidization treatment (heating treatment) is performed on the dry film. As a result, a molded article of a polyimide resin is formed.

Regarding the heating conditions for the imidization treatment, for example, the dry film is heated at a temperature of 150° C. or higher and 400° C. or lower (preferably 200° C. or higher and 300° C. or lower) for 20 minutes or more and 60 minutes or less. Under the conditions, an imidization reaction occurs, and the molded article of the polyimide resin is formed. During the heating reaction, for example, it is preferable to heat the dry film by slowly increasing the temperature in stages or at a constant speed, before the temperature reaches the final heating temperature. The imidization temperature varies, for example, with the type of tetracarboxylic acid dianhydride and diamine used as raw materials. In a case where the dry film is not fully imidized, poor mechanical and electrical characteristics are obtained. Therefore, the imidization temperature is set such that imidization goes to completion.

Thereafter, the molded article of the polyimide resin is removed from the cylindrical substrate to obtain an endless belt.

Hitherto, the manufacturing method of a single layer endless belt has been described. In order to obtain a multilayer endless belt, by appropriately forming layers other than the layer containing a resin and the specific silicone on the molded article of the polyimide resin, an endless belt is obtained.

Polyimide Precursor Composition

The polyimide precursor composition contains a polyimide precursor, the specific silicone, and a solvent.

Examples of the manufacturing method of the polyimide precursor composition include a method of polymerizing the aforementioned tetracarboxylic acid dianhydride and diamine compound in a solvent to obtain a polyimide precursor, and then adding the specific silicone.

During the polymerization reaction of the polyimide precursor, the reaction temperature may be, for example, 0° C. or higher and 70° C. or lower. The reaction temperature is, for example, more preferably 10° C. or higher and 60° C. or lower, and even more preferably 20° C. or higher and 55° C. or lower. In a case where the reaction temperature is 0° C. or higher, the progress of the polymerization reaction is accelerated, the time required for the reaction is shortened, and the productivity is likely to be improved. On the other hand, in a case where the reaction temperature is 70° C. or lower, the progress of the imidization reaction that occurs in the molecule of the generated polyimide precursor is hindered, and the precipitation or gelation resulting from the deterioration of solubility of the polyimide precursor is likely to be suppressed.

The time required for the polymerization reaction of the polyimide precursor may be, for example, within a range of 1 hour or more and 24 hours or less, depending on the reaction temperature.

The content of the specific silicone in the polyimide precursor composition is, for example, preferably 1% by mass or more and 10% by mass or less with respect to the solid content in the polyimide precursor composition.

Examples of Uses of Endless Belt

The endless belt according to the present exemplary embodiment can be used, for example, as an endless belt for an electrophotographic image forming apparatus. Examples of the endless belt for the electrophotographic image forming apparatus include an intermediate transfer belt, a transfer belt (recording medium transport belt), a fixing belt (heating belt or pressing belt), a transport belt (recording medium transport belt), and the like. The endless belt according to the present exemplary embodiment can also be used, for example, as a belt-like member, such as a transport belt, a driving belt, a laminated belt, an electric insulating material, a pipe coating material, an electromagnetic wave insulating material, a heat source insulator, or an electromagnetic wave absorbent film, in addition to the endless belt for an image forming apparatus.

The transfer device according to the present exemplary embodiment includes an intermediate transfer member that has an outer peripheral surface to which a toner image is to be transferred and has the endless belt according to the present exemplary embodiment, a primary transfer device that has a primary transfer member performing primary transfer of a toner image formed on a surface of an image holder to the outer peripheral surface of the intermediate transfer member, a secondary transfer device that has a secondary transfer member which is arranged in contact with the outer peripheral surface of the intermediate transfer member and performs secondary transfer of the toner image transferred to the outer peripheral surface of the intermediate transfer member to a surface of a recording medium, and a cleaning device that has a cleaning blade and brings the cleaning blade into contact with the intermediate transfer member to remove a residual toner.

In the primary transfer device, the primary transfer member is arranged to face the image holder across the intermediate transfer member. In the primary transfer device, by the primary transfer member, a voltage with polarity opposite to charging polarity of a toner is applied to the intermediate transfer member, such that primary transfer of a toner image to the outer peripheral surface of the intermediate transfer member is performed.

In the secondary transfer device, the secondary transfer member is arranged on a toner image-holding side of the intermediate transfer member. The secondary transfer device includes, for example, a secondary transfer member and a back surface member that is arranged on the side opposite to the toner image-holding side of the intermediate transfer member. In the secondary transfer device, the intermediate transfer member and the recording medium are interposed between the secondary transfer member and the back surface member, and a transfer electric field is formed. In this way, secondary transfer of the toner image formed on the intermediate transfer member to the recording medium is performed.

The secondary transfer member may be a secondary transfer roll or a secondary transfer belt. As the back surface member, for example, a back roll is used.

The cleaning device is a device that brings a cleaning blade into contact with the intermediate transfer member to remove a residual toner. The cleaning device has, for example, a housing, a cleaning blade, and a container to contain the collected toner. The cleaning device may additionally have other members or mechanisms.

The coefficient of dynamic friction of the intermediate transfer member with respect to the cleaning blade is, for example, preferably 0.6 or less, more preferably 0.5 or less, and even more preferably 0.4 or less.

In a case where the coefficient of dynamic friction is 0.6 or less, the friction between the intermediate transfer member and the cleaning blade is further reduced. As a result, the posture of the cleaning blade is maintained, and cleanliness is further improved.

Procedure of Measuring Coefficient of Dynamic Friction of Intermediate Transfer Member with Respect to Cleaning Blade The procedure of measuring the coefficient of dynamic friction of the intermediate transfer member with respect to the cleaning blade is the same as "Procedure of measuring coefficient of dynamic friction of outer peripheral surface of endless belt" described above, except that the cleaning blade provided in the transfer device is used as a cleaning blade.

The transfer device according to the present exemplary embodiment may be a transfer device that transfers a toner image to the surface of a recording medium via a plurality of intermediate transfer members. That is, the transfer device may be, for example, a transfer device of performing primary transfer of a toner image to a first intermediate transfer member from an image holder, performing secondary transfer of the toner image to a second intermediate transfer member from the first intermediate transfer member, and then performing tertiary transfer of the toner image to a recording medium from the second intermediate transfer member.

In a case where the transfer device includes a plurality of intermediate transfer members, as an intermediate transfer member that transfers a toner image to a recording medium, at least the endless belt according to the present exemplary embodiment is used.

Cleaning Blade

Details of the cleaning blade included in the cleaning device will be described below.

Modulus of Repulsion Elasticity

The modulus of repulsion elasticity of a contact portion of the cleaning blade that comes into contact with the intermediate transfer member is, for example, preferably 20% or more and 33% or less, more preferably 25% or more and 33% or less, and even more preferably 27% or more and 30% or less.

In a case where the modulus of repulsion elasticity of the contact portion is 20% or more, the posture of the cleaning blade is more likely to be maintained, and the cleanliness is further improved. In a case where the modulus of repulsion elasticity of the contact portion is 33% or less, the hardness of the contact portion of the cleaning blade is not too high, which suppresses the occurrence of chipping of the contact portion of the cleaning blade.

The modulus of repulsion elasticity is measured in accordance with JIS K6400-3 (2011).

Hardness

The hardness of the contact portion of the cleaning blade that comes into contact with the intermediate transfer member is, for example, preferably 800 or more and 90° or less, more preferably 820 or more and 880 or less, and even more preferably 840 or more and 860 or less.

The hardness is measured with a durometer. As the durometer, for example, it is possible to use an Asker A type rubber hardness tester manufactured by Asker.

Composition

It is preferable that, for example, at least the contact portion of the cleaning blade that comes into contact with the intermediate transfer member contain polyurethane rubber.

The polyurethane rubber is obtained by polymerizing at least a polyol component and a polyisocyanate component. As necessary, the polyurethane rubber may be obtained by polymerizing a resin having a functional group capable of reacting with an isocyanate group of polyisocyanate, in addition to the polyol component.

The polyol component includes, for example, a high-molecular-weight polyol and a low-molecular-weight polyol.

The high-molecular-weight polyol component is a polyol having a number-average molecular weight of 500 or more (for example, preferably 500 or more and 5,000 or less). Examples of the high-molecular-weight polyol component include known polyols such as a polyester polyol obtained by dehydrocondensation of a low-molecular-weight polyol and a dibasic acid, a polycarbonate polyol obtained by a reaction between a low-molecular-weight polyol and an alkyl carbonate, a polycaprolactone polyol, and a polyether polyol. Examples of commercially available products of high-molecular-weight polyols include PLACCEL 205 and PLACCEL 240 manufactured by Daicel Corporation.

The number-average molecular weight is a value measured by gel permeation chromatography (GPC). The same shall apply hereinafter.

Each of the high-molecular-weight polyols may be used alone, or two or more high-molecular-weight polyols may be used in combination.

The polymerization ratio of the high-molecular-weight polyol component to all the polymerization components of the polyurethane rubber may be, for example, 30 mol % or more and 50 mol % or less, and is preferably 40 mol % or more and 50 mol % or less.

The low-molecular-weight polyol component is a polyol having a molecular weight (number-average molecular weight) of less than 500. The low-molecular-weight polyol is a material that function as a chain extender and a crosslinking agent.

Examples of the low-molecular-weight polyol component include 1,4-butanediol. The ratio of 1,4-butanediol to the total amount of polyol components (high-molecular-weight polyol+low-molecular-weight polyol) may be, for example, more than 50 mol % and 75 mol % or less (for example, preferably 52 mol % or more and 75 mol % or less, more preferably 55 mol % or more and 75 mol % or less, and even more preferably 55 mol % or more and 60 mol % or less).

In a case where the ratio of 1,4-butanediol is in the above range, abrasion resistance is improved.

The ratio of 1,4-butanediol to the total amount of the low-molecular-weight polyol component is, for example, preferably 80 mol % or more, more preferably 90 mol % or more, and even more preferably 100 mol %. That is, for example, using only 1,4-butanediol as the low-molecular-weight polyol component is the most preferable.

Examples of the low-molecular-weight polyol component also include a diol (difunctional), a triol (trifunctional), and a tetraol (tetrafunctional) which are well known as chain extenders and crosslinking agents, in addition to 1,4-butanediol.

Each of the polyols other than 1,4-butanediol may be used alone, or two or more such polyols may be used in combination.

The polymerization ratio of the low-molecular-weight polyol component to all the polymerization components of the polyurethane rubber may be, for example, more than 50 mol % and 75 mol % or less, preferably 52 mol % or more and 75 mol % or less, more preferably 55 mol % or more and 75 mol % or less, and even more preferably 55 mol % or more and 60 mol % or less.

Polyisocyanate Component

Examples of the polyisocyanate component include 4,4'-diphenylmethane diisocyanate (MDI), 2,6-toluene diisocyanate (TDI), 1,6-hexane diisocyanate (HDI), 1,5-naphthalene diisocyanate (NDI), and 3,3-dimethylbiphenyl-4,4-diisocyanate (TODI).

As the polyisocyanate component, for example, 4,4'-diphenylmethane diisocyanate (MDI), 1,5-naphthalene diisocyanate (NDI), and hexamethylene diisocyanate (HDI) are more preferable.

Each of the polyisocyanate components may be used alone, or two or more polyisocyanate components may be used in combination.

The polymerization ratio of the polyisocyanate component to all the polymerization components of the polyurethane rubber may be, for example, 5 mol % or more and 25 mol % or less, and preferably 10 mol % or more and 20 mol % or less.

In a case where the polymerization ratio of the polyisocyanate component is within the above range, the aforementioned characteristics (1) and (2) are likely to be satisfied (particularly, 100% modulus, indentation modulus, tensile stress, and elongation at break are likely to satisfy the above range), and abrasion resistance is further improved.

Composition of Non-Contact Member

The composition of a region other than the contact portion in the cleaning blade in which the contact portion and the region other than the contact portion are configured with different materials will be described.

For the region other than the contact portion, any of known materials can be used without particular limitations, as long as the region has a function of supporting the contact portion. Specifically, examples of the material used for the region other than the contact portion include polyurethane rubber, silicon rubber, fluororubber, chloroprene rubber, butadiene rubber, and the like. Among these, for example, polyurethane rubber may be used. Examples of the polyurethane rubber include ester-based polyurethane and ether-based polyurethane. Among these, for example, ester-based polyurethane is particularly preferable.

Manufacturing Method of Cleaning Blade

For manufacturing the cleaning blade, a general polyurethane manufacturing method, such as a prepolymer method or a one-shot method, is used. With the prepolymer method, polyurethane extremely resistant to abrasion is obtained. Therefore, this method is suited for the present exemplary embodiment, but the present exemplary embodiment is not limited by the manufacturing method.

The cleaning blade is prepared by forming a composition for forming a cleaning blade prepared by the above method into a sheet by using, for example, centrifugal molding, extrusion molding, or the like and processing the sheet by cutting or the like.

Image Forming Apparatus

The image forming apparatus according to the present exemplary embodiment includes a toner image forming device that forms a toner image on a surface of an image holder and a transfer device that transfers the toner image formed on the surface of the image holder to a surface of a recording medium. As the transfer device, the transfer device according to the present exemplary embodiment described above is used.

Examples of the toner image forming device include a device including an image holder, a charging device that charges the surface of the image holder, an electrostatic latent image forming device that forms an electrostatic latent image on the surface of the charged image holder, and a developing device that develops the electrostatic latent image formed on the surface of the image holder with a developer containing a toner to form a toner image.

As the image forming apparatus according to the present exemplary embodiment, known image forming apparatuses are used which include an apparatus including a fixing unit that fixes a toner image transferred to the surface of a recording medium; an apparatus including a cleaning unit that cleans the surface of an image holder not yet being charged after transfer of a toner image; an apparatus including an electricity removing unit that removes electricity by irradiating the surface of an image holder, the image holder not yet being charged, with electricity removing light after transfer of a toner image; an apparatus including an image holder heating member that raises the temperature of an image holder to reduce relative temperature, and the like.

The image forming apparatus according to the present exemplary embodiment may be either an image forming apparatus for a dry developing method or an image forming apparatus for a wet developing method (developing method using a liquid developer).

In the image forming apparatus according to the present exemplary embodiment, for example, a portion including the image holder may be a cartridge structure (process cartridge) detachable from the image forming apparatus. As the process cartridge, for example, a process cartridge including a toner image forming device and a transfer device is preferably used.

Hereinafter, an example of the image forming apparatus according to the present exemplary embodiment will be described with reference to drawings. Here, the image forming apparatus according to the present exemplary embodiment is not limited thereto. Hereinafter, among the parts shown in the drawing, main parts will be described, and others will not be described.

Image Forming Apparatus

Figure 2:
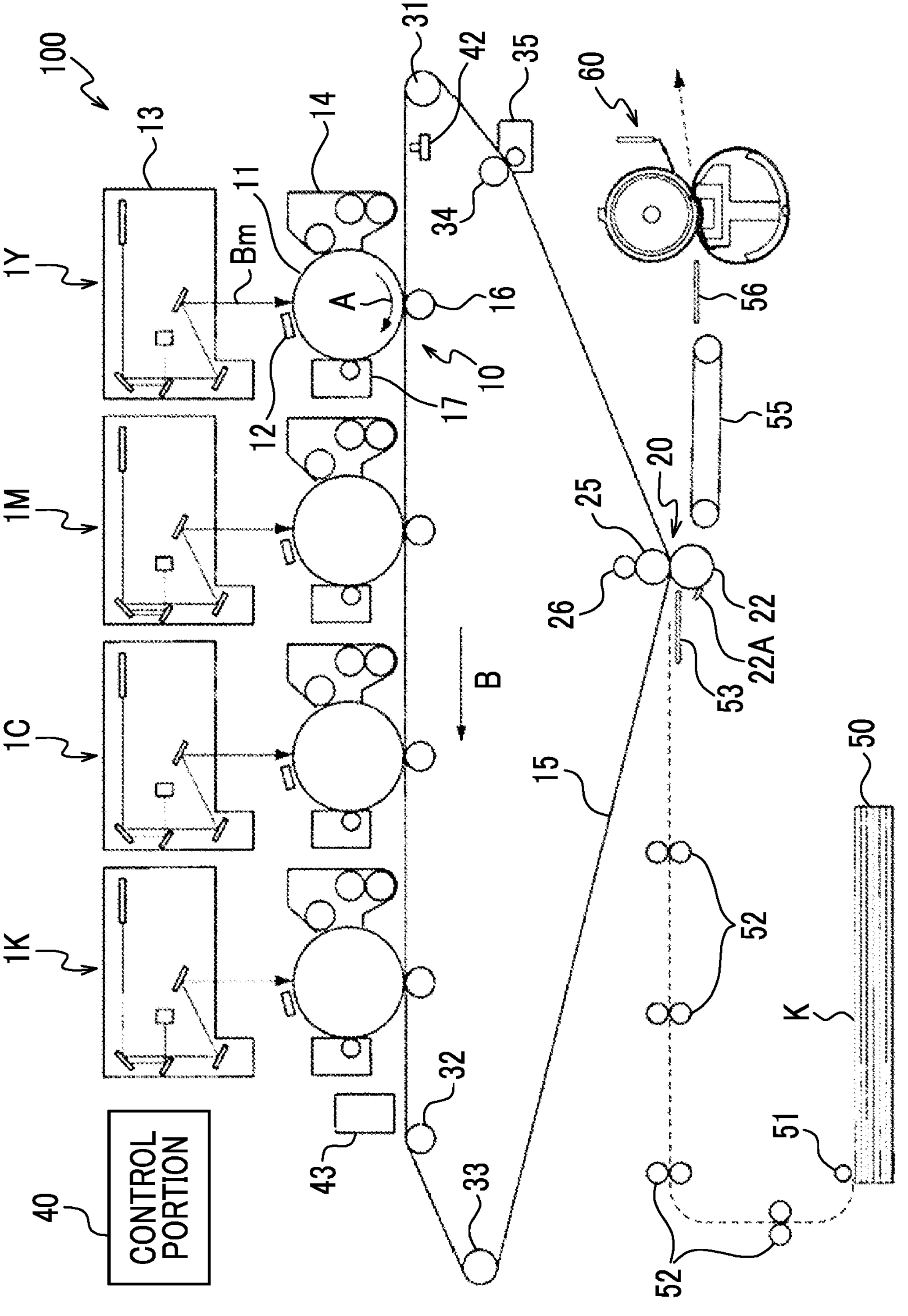
FIG. 2 is a schematic configuration view showing an example of an image forming apparatus according to the present exemplary embodiment.

FIG. 2 is a schematic configuration view showing the configuration of the image forming apparatus according to the present exemplary embodiment.

As shown in FIG. 2, an image forming apparatus 100 according to the present exemplary embodiment is, for example, an intermediate transfer-type image forming apparatus that is generally called a tandem type, and includes a plurality of image forming units 1Y, 1M, 1C, and 1K (an example of a toner image forming device) in which a toner image of each color component is formed by an electrophotographic method, a primary transfer portion 10 that performs sequential transfer (primary transfer) of the toner image of each color component formed by each of the image forming units 1Y, 1M, 1C, and 1K to an intermediate transfer belt 15, a secondary transfer portion 20 that performs batch transfer (secondary transfer) of the overlapped toner images transferred to the intermediate transfer belt 15 to paper K as a recording medium, and a fixing device 60 that fixes the images transferred by the secondary transfer on the paper K. The image forming apparatus 100 also has a control portion 40 that controls the operation of each device (each portion).

Each of the image forming units 1Y, 1M, 1C, and 1K of the image forming apparatus 100 includes a photoreceptor 11 (an example of an image holder) that holds the toner image formed on the surface thereof and rotates in the direction of an arrow A.

As an example of a charging unit, a charger 12 for charging the photoreceptor 11 is provided around the photoreceptor 11. As an example of a latent image forming unit, a laser exposure machine 13 that draws an electrostatic latent image on the photoreceptor 11 is provided (in FIG. 1, an exposure beam is represented by a mark Bm).

Around the photoreceptor 11, as an example of a developing unit, there are provided a developing machine 14 that contains toners of each color component and makes the electrostatic latent image on the photoreceptor 11 into a visible image by using the toners and a primary transfer roll 16 that transfers toner images of each color component formed on the photoreceptor 11 to the intermediate transfer belt 15 by the primary transfer portion 10.

Around the photoreceptor 11, there are provided a photoreceptor cleaner 17 that removes the residual toner on the photoreceptor 11 and devices for electrophotography, such as the charger 12, the laser exposure machine 13, the developing machine 14, the primary transfer roll 16, and the photoreceptor cleaner 17, that are arranged in sequence along the rotation direction of the photoreceptor 11. These image forming units 1Y, 1M, 1C, and 1K are substantially linearly arranged in order of yellow (Y), magenta (M), cyan (C), and black (K) from the upstream side of the intermediate transfer belt 15.

By various rolls, the intermediate transfer belt 15 is driven to circulate (rotate) in a direction B shown in FIG. 2 at a speed fit for the purpose. The image forming apparatus 100 has, as the various rolls, a driving roll 31 that is driven by a motor (not shown in the drawing) excellent in maintaining a constant speed and rotates the intermediate transfer belt 15, a supporting roll 32 that supports the intermediate transfer belt 15 substantially linearly extending along the arrangement direction of the photoreceptors 11, a tension applying roll 33 that applies tension to the intermediate transfer belt 15 and functions as a correcting roll preventing meandering of the intermediate transfer belt 15, a back roll 25 that is provided in the secondary transfer portion 20, and a back roll 34 for cleaning that is provided in a cleaning portion scrapping off the residual toner on the intermediate transfer belt 15.

The primary transfer portion 10 is configured with the primary transfer roll 16 that is arranged to face the photoreceptor 11 across the intermediate transfer belt 15. The primary transfer roll 16 is arranged to be pressed on the photoreceptor 11 across the intermediate transfer belt 15. Furthermore, the polarity of voltage (primary transfer bias) applied to the primary transfer roll 16 is opposite to the charging polarity (negative polarity, the same shall apply hereinafter) of the toner. As a result, the toner image on each photoreceptor 11 is sequentially electrostatically sucked onto the intermediate transfer belt 15, which leads to the formation of overlapped toner images on the intermediate transfer belt 15.

The secondary transfer portion 20 includes the back roll 25 and a secondary transfer roll 22 that is arranged on a toner image-holding surface side of the intermediate transfer belt 15.

The back roll 25 is formed such that the surface resistivity thereof is $1\times10^{7}\Omega/\square$ or more and $1\times10^{10}\Omega/\square$ or less. The hardness of the back roll 25 is set to, for example, 70° (ASKER C: manufactured by KOBUNSHI KEIKI CO., LTD., the same shall apply hereinafter). The back roll 25 is arranged on the back surface side of the intermediate transfer belt 15 to configure a counter electrode of the secondary transfer roll 22. A power supply roll 26 made of a metal to which secondary transfer bias is stably applied is arranged to come into contact with the back roll 25.

On the other hand, the secondary transfer roll 22 is a cylindrical roll having a volume resistivity of $10^{7.5}$ Ωcm or more and $10^{8.5}$ Ω cm or less. The secondary transfer roll 22 is arranged to be pressed on the back roll 25 across the intermediate transfer belt 15. The secondary transfer roll 22 is grounded such that the secondary transfer bias is formed between the secondary transfer roll 22 and the back roll 25, which induces secondary transfer of the toner image onto the paper K transported to the secondary transfer portion 20.

On the downstream side of the secondary transfer portion 20 of the intermediate transfer belt 15, an intermediate transfer belt-cleaning member 35 separable from the intermediate transfer belt 15 is provided which removes the residual toner or paper powder on the intermediate transfer belt 15 remaining after the secondary transfer and cleans the outer peripheral surface of the intermediate transfer belt 15.

On the downstream side of the secondary transfer portion 20 of the secondary transfer roll 22, a secondary transfer roll-cleaning member 22A is provided which removes the residual toner or paper powder on the secondary transfer roll 22 remaining after the secondary transfer and cleans the outer peripheral surface of the intermediate transfer belt 15. Examples of the secondary transfer roll-cleaning member 22A include a cleaning blade. The secondary transfer roll-cleaning member 22A may be a cleaning roll.

The intermediate transfer belt 15, the primary transfer roll 16, the secondary transfer roll 22, and the intermediate transfer belt-cleaning member 35 correspond to an example of the transfer device.

Figure 3:
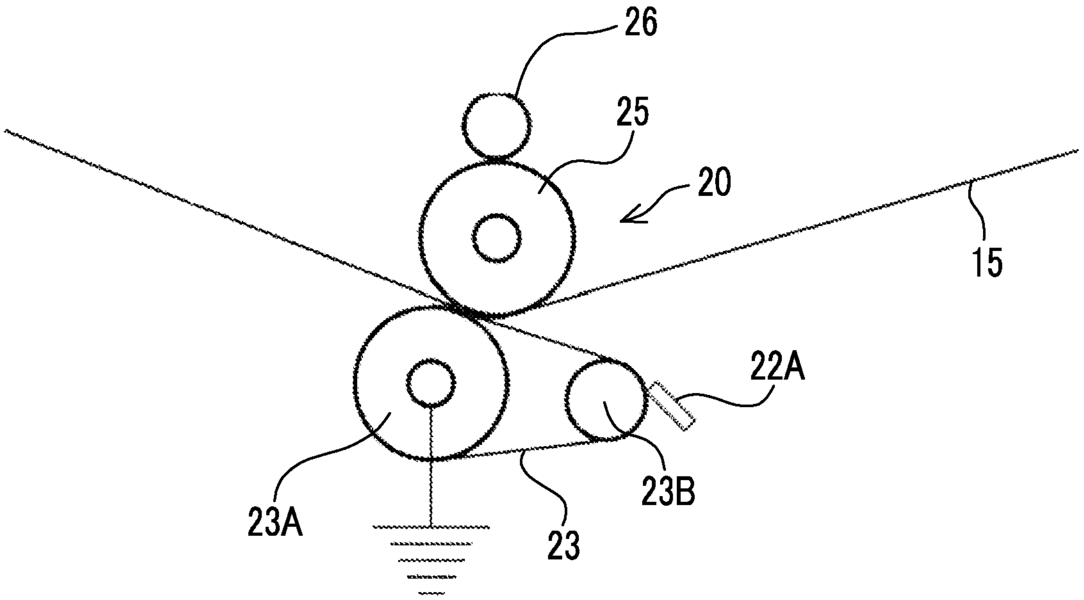
FIG. 3 is a schematic configuration view showing the periphery of a secondary transfer portion in another example of the image forming apparatus according to the present exemplary embodiment.

The image forming apparatus 100 may have a configuration in which the apparatus includes a secondary transfer belt (an example of a secondary transfer member) instead of the secondary transfer roll 22. Specifically, as shown in FIG. 3, the image forming apparatus 100 may include a secondary transfer device including a secondary transfer belt 23, a driving roll 23A that is disposed to face the back roll 25 via the secondary transfer belt 23 and the intermediate transfer belt 15, and an idler roll 23B that allows the secondary transfer belt 23 to be stretched thereon in cooperation with the driving roll 23A.

On the other hand, on the upstream side of the yellow image forming unit 1Y, a reference sensor (home position sensor) 42 is arranged which generates a reference signal to be a reference for taking the image forming timing in each of the image forming units 1Y, 1M, 1C, and 1K. On the downstream side of the black image forming unit 1K, an image density sensor 43 for adjusting image quality is arranged. The reference sensor 42 recognizes a mark provided on the back side of the intermediate transfer belt 15 and generates a reference signal. Each of the image forming units 1Y, 1M, 1C, and 1K is configured such that these units start to form images according to the instruction from the control portion 40 based on the recognition of the reference signal.

The image forming apparatus according to the present exemplary embodiment includes, as a transport unit for transporting the paper K, a paper storage portion 50 that stores the paper K, a paper feeding roll 51 that takes out and transports the paper K stacked in the paper storage portion 50 at a predetermined timing, a transport roll 52 that transports the paper K transported by the paper feeding roll

51, a transport guide 53 that sends the paper K transported by the transport roll 52 to the secondary transfer portion 20, a transport belt 55 that transports the paper K transported after going through secondary transfer by the secondary transfer roll 22 to the fixing device 60, and a fixing entrance guide 56 that guides the paper K to the fixing device 60.

Next, the basic image forming process of the image forming apparatus according to the present exemplary embodiment will be described.

In the image forming apparatus according to the present exemplary embodiment, image data output from an image reading device not shown in the drawing, a personal computer (PC) not shown in the drawing, or the like is subjected to image processing by an image processing device not shown in the drawing, and then the image forming units 1Y, 1M, 1C, and 1K perform the image forming operation.

In the image processing device, image processing, such as shading correction, misregistration correction, brightness/color space conversion, gamma correction, or various image editing works such as frame erasing or color editing and movement editing, is performed on the input image data. The image data that has undergone the image processing is converted into color material gradation data of 4 colors, Y, M, C, and K, and is output to the laser exposure machine 13.

In the laser exposure machine 13, according to the input color material gradation data, for example, the photoreceptor 11 of each of the image forming units 1Y, 1M, 1C, and 1K is irradiated with the exposure beam Bm emitted from a semiconductor laser. The surface of each of the photoreceptors 11 of the image forming units 1Y, 1M, 1C, and 1K is charged by the charger 12 and then scanned and exposed by the laser exposure machine 13. In this way, an electrostatic latent image is formed. By each of the image forming units 1Y, 1M, 1C, and 1K, the formed electrostatic latent image is developed as a toner image of each of the colors Y, M, C, and K.

In the primary transfer portion 10 where each photoreceptor 11 and the intermediate transfer belt 15 come into contact with each other, the toner images formed on the photoreceptors 11 of the image forming units 1Y, 1M, 1C, and 1K are transferred onto the intermediate transfer belt 15. More specifically, in the primary transfer portion 10, by the primary transfer roll 16, a voltage (primary transfer bias) with a polarity opposite to the polarity of the charging polarity (negative polarity) of the toner is applied to the substrate of the intermediate transfer belt 15, and the toner images are sequentially overlapped on the outer peripheral surface of the intermediate transfer belt 15 and subjected to primary transfer.

After the primary transfer by which the toner images are sequentially transferred to the outer peripheral surface of the intermediate transfer belt 15, the intermediate transfer belt 15 moves, and the toner images are transported to the secondary transfer portion 20. In a case where the toner images are transported to the secondary transfer portion 20, in the transport unit, the paper feeding roll 51 rotates in accordance with the timing at which the toner images are transported to the secondary transfer portion 20, and the paper K having the target size is supplied from the paper storage portion 50. The paper K supplied from the paper feeding roll 51 is transported by the transport roll 52, passes through the transport guide 53, and reaches the secondary transfer portion 20. Before reaching the secondary transfer portion 20, the paper K is temporarily stopped, and a positioning roll (not shown in the drawing) rotates according to the movement timing of the intermediate transfer belt 15 holding the toner images, such that the position of the paper K is aligned with the position of the toner images.

In the secondary transfer portion 20, via the intermediate transfer belt 15, the secondary transfer roll 22 is pressed on the back roll 25. At this time, the paper K transported at the right timing is interposed between the intermediate transfer belt 15 and the secondary transfer roll 22. At this time, in a case where a voltage (secondary transfer bias) with the same polarity as the charging polarity (negative polarity) of the toner is applied from the power supply roll 26, a transfer electric field is formed between the secondary transfer roll 22 and the back roll 25. In the secondary transfer portion 20 pressed by the secondary transfer roll 22 and the back roll 25, the unfixed toner images held on the intermediate transfer belt 15 are electrostatically transferred onto the paper K in a batch.

Thereafter, the paper K to which the toner images are electrostatically transferred is transported in a state of being peeled off from the intermediate transfer belt 15 by the secondary transfer roll 22, and is transported to the transport belt 55 provided on the downstream side of the secondary transfer roll 22 in the paper transport direction. The transport belt 55 transports the paper K to the fixing device 60 according to the optimum transport speed in the fixing device 60. The unfixed toner images on the paper K transported to the fixing device 60 are fixed on the paper K by being subjected to a fixing treatment by heat and pressure by the fixing device 60. Then, the paper K on which a fixed image is formed is transported to an ejected paper-storing portion (not shown in the drawing) provided in an ejection portion of the image forming apparatus.

Meanwhile, after the transfer to the paper K is finished, the residual toner remaining on the intermediate transfer belt 15 is transported to the cleaning portion as the intermediate transfer belt 15 rotates, and is removed from the intermediate transfer belt 15 by the back roll 34 for cleaning and an intermediate transfer belt-cleaning member 35.

Hitherto, the present exemplary embodiment has been described. However, the present exemplary embodiment is not limited to the above exemplary embodiments, and various modifications, changes, and ameliorations can be added thereto.

EXAMPLES

Examples will be described below, but the present invention is not limited to these examples. In the following description, unless otherwise specified, "parts" and "%" are based on mass in all cases.

Example 1

(Coating Film Forming Step and Drying Step)

An N-methyl-2-pyrrolidone (NMP) solution of a polyimide precursor (a polymer of 3,3',4,4'-biphenyltetracarboxylic acid dianhydride as an aromatic tetracarboxylic acid dianhydride and 4,4'-diaminodiphenyl ether as a diamine compound) is prepared (the amount of an imide-based resin obtained by imidizing the polyimide precursor contained in the solution is 18% by mass with respect to the total mass of the solution (hereinafter, the amount of an imide-based resin obtained by imidizing the polyimide precursor contained in the solution will be called "solid content of the resin"). As conductive particles, carbon black (FW200 manufactured by Orion Engineered Carbons) is added to the solution, in an amount of 19 parts by mass with respect to 100 parts by mass of the solid content of the resin in the solution, and the mixture is stirred. Then, as the specific silicone, polyether-modified polysiloxane (KP-126 manufactured by Shin-Etsu Chemical Co., Ltd.) is added thereto in an amount of 3 parts by mass with respect to 100 parts by mass of the solid content of the resin in the solution, and the mixture is stirred, thereby obtaining a polyimide precursor composition.

The outer surface of a cylindrical aluminum mold (substrate) having an outer diameter of 278 mm is coated with the prepared polyimide precursor composition via a dispenser, followed by rotary drying at 140° C. for 30 minutes.

(Baking Step)

Then, the mold is heated at 320° C. for 2 hours in an oven while being rotated, and then taken out of the oven.

(Removing Step)

The molded article of the polyimide resin formed on the outer peripheral surface of the mold is removed from the mold and cut in a width of 363 mm. Thereafter, a reinforcing tape (N31C manufactured by NITTO DENKO CORPORATION.) is attached to the side of the outer peripheral surface at both ends in the width direction, and a guide member (manufactured by Chiyoda Corporation) is attached to the side of the inner surface at both ends in the width direction, thereby obtaining a single-layer endless belt having a thickness of 0.08 mm.

Examples 2 to 8 and Comparative Examples 1, 3, and 4

A single-layer endless belt is obtained by the same procedure as in Example 1, except that the type of specific silicone and the amount of specific silicone added are changed as shown in Table 1.

Comparative Example 2

A single-layer endless belt is obtained by the same procedure as in Example 1, except that the specific silicone is not added while FTERGENT 601ADH2 (manufactured by Neos Corporation) which is a fluorine-based surfactant is added.

TABLE 1

| | Specific silicone or fluorine-based surfactant | | | |
|---|---|---|---|---|
| | | Type | Molecular amount | Addition amount (parts by mass) |
| Example 1 | KP-126 | PE-modified Si | 40,000 | 3 |
| Example 2 | KP-120/ KP-126 | PE-modified Si | 13,000/ 40,000 | 3/3 |
| Example 3 | KP-126 | PE-modified Si | 40,000 | 2 |
| Example 4 | KP-126 | PE-modified Si | 40,000 | 1 |
| Example 5 | KP-124 | PE-modified Si | 5,000 | 3 |
| Example 6 | KP-106 | PE-modified Si | 1,000 | 5 |
| Example 7 | KP-104 | PE-modified Si | 5,000 | 3 |
| Example 8 | KP-621 | PES resin-modified Si | 35,000 | 3 |
| Comparative Example 1 | — | — | — | 0 |
| Comparative Example 2 | 601ADH12 | — | — | 3 |
| Comparative Example 3 | KP-106 | PE-modified Si | 1,000 | 0.5 |
| Comparative Example 4 | KP-310 | Silicone oil | 80,000 | 3 |

In Table 1, "Addition amount (parts by mass)" means the amount of the specific silicone or the fluorine-based surfactant added with respect to 100 parts by mass of the solid content of the resin in (coating film forming step and drying step).

In Table 1, for Example 2, "KP-120/KP-126" is written in the column of "Type", which means that KP-120 and KP-126 that are specific silicone are used.

In Table 1, for Example 2, "13,000/40,000" is written in the column of "Molecular weight", which means that KP-120 and KP-126, which are the specific silicone, have a molecular weight of 13,000 and 40,000 respectively.

In Table 1, for Example 2, "3/3" is written in the column of "Addition amount (parts by mass)", which means that each of KP-120 and KP-126, which are the specific silicone, added in an amount of 3 parts by mass with respect to 100 parts by mass of the solid content of the resin.

In Table 1, "PE-modified Si" means polyether-modified polysiloxane.

In Table 1, "PES resin-modified Si" means polyester resin-modified polysiloxane.

The abbreviations in the tables will be described below.

KP-126: Polyether-modified polysiloxane which is the specific silicone (KP-126 manufactured by Shin-Etsu Chemical Co., Ltd.)

KP-120: Polyether-modified polysiloxane which is the specific silicone (KP-120 manufactured by Shin-Etsu Chemical Co., Ltd.)

601ADH2: FTERGENT 601ADH2 (manufactured by Neos Corporation) which is a fluorine-based surfactant.

KP-124: Polyether-modified polysiloxane which is the specific silicone (KP-124 manufactured by Shin-Etsu Chemical Co., Ltd.)

KP-106: Polyether-modified polysiloxane which is the specific silicone (KP-106 manufactured by Shin-Etsu Chemical Co., Ltd.)

KP-104: Polyether-modified polysiloxane which is the specific silicone (KP-104 manufactured by Shin-Etsu Chemical Co., Ltd.)

KP-621: Polyester resin-modified polysiloxane which is the specific silicone (KP-621 manufactured by Shin-Etsu Chemical Co., Ltd.)

KP-310: Silicone oil which is the specific silicone (dimethyl polysiloxane, KP-310 manufactured by Shin-Etsu Chemical Co., Ltd.)

Preparation of Cleaning Blades 1 to 3

Cleaning Blade 1

A cleaning blade consisting of urethane rubber having a hardness of 810 is adopted as a cleaning blade 1.

Dimensions: length 13 mm×width 347 mm×thickness 2.0 mm

Modulus of repulsion elasticity 28%

Cleaning Blade 2

A cleaning blade consisting of urethane rubber having a hardness of 85° is adopted as a cleaning blade 2.

Dimensions: length 13 mm×width 347 mm×thickness 2.0 mm

Modulus of repulsion elasticity 33%

Cleaning Blade 3

A cleaning blade consisting of ether-based urethane rubber having a hardness of 71° is adopted as a cleaning blade 3.

Dimensions: length 13 mm×width 347 mm×thickness 2.0 mm

Modulus of repulsion elasticity 35%

Cleaning Blade 4

A cleaning blade consisting of ether-based urethane rubber having a hardness of 650 is adopted as a cleaning blade 4.

Dimensions: length 13 mm×width 347 mm×thickness 2.0 mm

Modulus of repulsion elasticity 20%

Cleaning Blade 5

A cleaning blade consisting of ether-based urethane rubber having a hardness of 600 is adopted as a cleaning blade 5.

Dimensions: length 13 mm×width 347 mm×thickness 2.0 mm

Modulus of repulsion elasticity 18%

Evaluation

The prepared cleaning blade and the endless belt prepared in each example as an intermediate transfer belt are combined as described in Table 2 and attached to the transfer device of the image forming apparatus Apeos C5570 (manufactured by FUJIFILM Business Innovation Corp.), and evaluated as follows.

The cleaning blade is brought into contact with the endless belt, such that the cleaning blade is parallel to the width direction of the endless belt and forms an angle of 20° with the endless belt. Furthermore, the endless belt and the cleaning blade are mounted in a state where a normal force of 1 N is being applied to the contact portion between the endless belt and the cleaning blade.

Image Quality Evaluation 400,000 images each including an image portion and a non-image portion are formed. Then, 30 halftone images (image density: 30%, Blue) are formed, and the formed images are visually checked to evaluate the image quality based on the following evaluation standard.

Evaluation Standard

A: There are no image defects.

B: There are image defects that are in an allowable range.

C: There are unacceptable image defects.

Transferability Evaluation

A 30% halftone Blue image is printed on 1,000 sheets of embossed paper (BOSSYUKI). By visually checking whether or not color omission occurs in the depressions of the embossed paper and comparing the first image with the 1,000th image, transfer retention properties are evaluated. The evaluation standard is as follows.

A: No color omission occurs in the depressions of both the first image and the 1,000th image.

B: Unlike the first image, the 1,000th image is found to have slight color omission in the depressions.

C: Unlike the first image, the 1,000th image is found to have color omission in the depressions, but the color omission is in an acceptable range.

D: Unlike the first image, the 1,000th image has serious color omission in the depressions.

Cleanliness Evaluation

Based on whether or not the halftone image used in the image quality evaluation has streaks in the paper transport direction, cleanliness is evaluated. The cleanliness evaluation is performed based on the following evaluation standard.

Evaluation Standard

A: No streaks are found in the paper transport direction.

B: Three or less streaks have occurred in the paper transport direction.

C: Four or more and 8 or less streaks have occurred in the paper transport direction, but the streaks are in an allowable range.

D: More than 8 streaks have occurred in the paper transport direction.

TABLE 2

| | Endless belt | | | | | | |
|---|---|---|---|---|---|---|---|
| | Type of resin | Type of specific silicone | Molecular weight of specific silicone | Content of specific silicone (% by mass) | Absolute value of difference between SP values | Coefficent of dynamic friction-1 | Spray pressure (kPa) |
| Example 1 | Imide-based | PE-modified Si | 40,000 | 3 | 7.7 | 0.5 | 3 |
| Example 2 | Imide-based | PE-modified Si | 13,000/40,000 | 6 | 6.0/7.7 | 0.35 | 1.5 |
| Example 3 | Imide-based | PE-modified Si | 40,000 | 1.5 | 7.7 | 0.7 | 5.5 |
| Comparative Example 1 | Imide-based | — | — | 0 | — | 0.91 | 6.6 |
| Comparative Example 2 | Imide-based | — | — | 0 | — | 0.9 | 3.5 |
| Example 4 | Imide-based | PE-modified Si | 40,000 | 1 | 7.7 | 0.85 | 6.5 |
| Comparative Example 3 | Imide-based | PE-modified Si | 1,000 | 0.5 | 7.7 | 1 | 7.5 |
| Example 5 | Imide-based | PE-modified Si | 5,000 | 3 | 8 | 0.75 | 5.8 |
| Example 6 | Imide-based | PE-modified Si | 1,000 | 5 | 7.4 | 0.85 | 6 |
| Example 7 | Imide-based | PE-modified Si | 5,000 | 3 | 4 | 0.75 | 6 |
| Comparative Example 4 | Imide-based | PE-modified Si | 80,000 | 3 | 8.8 | Inevaluable due to occurrence of phase separation | |
| Example 8 | Imide-based | PE-modified Si | 35,000 | 3 | 7.1 | 0.6 | 5 |

| | Transfer device | | | | | |
|---|---|---|---|---|---|---|
| | Cleaning blade | | | Evaluation | | |
| | Type | Modulus of repulsion elasticity (%) | Coefficient of dynamic friction-2 | Image quality evaluation | Transferability evaluation | Cleanliness evaluation |
| Example 1 | 1 | 28 | 0.6 | A | A | A |
| | 2 | 33 | 0.6 | B | A | B |

TABLE 2-continued

| | | | | | | |
|---|---|---|---|---|---|---|
| | 3 | 35 | 0.7 | B | A | C |
| | 4 | 20 | 0.68 | A | A | B |
| | 5 | 18 | 0.75 | A | A | C |
| Example 2 | 1 | 28 | 0.6 | A | A | A |
| Example 3 | 1 | 28 | 0.6 | A | B | B |
| Comparative Example 1 | 1 | 28 | 0.85 | C | D | D |
| Comparative Example 2 | 1 | 28 | 0.985 | C | D | D |
| Example 4 | 1 | 28 | 0.75 | B | C | C |
| Comparative Example 3 | 1 | 28 | 0.85 | C | D | D |
| Example 5 | 1 | 28 | 0.7 | B | B | C |
| Example 6 | 1 | 28 | 0.85 | C | C | C |
| Example 7 | 1 | 28 | 0.7 | B | B | C |
| Comparative Example 4 | | | Inevaluable due to occurrence of phase separation | | | |
| Example 8 | 1 | 28 | 0.65 | B | B | B |

Hereinafter, the meaning of what are written in Table 2 will be described.

"PE-modified Si" and "PES resin-modified Si" have the same definitions as in Table 1.

"Content of specific silicone" means the content of the specific silicone with respect to the total mass of the layer containing a resin and the specific silicone.

"Absolute value of difference between SP values" means the absolute value of a difference between the SP value of the resin and the SP value of the specific silicone. For Example 2, "6.0/7.7" is written in the column of "Absolute value of difference between SP values", which means that the absolute value of the difference between the SP value of the resin and the SP value of KP-120 as the specific silicone is 6.0, and that the absolute value of the difference between the SP value of the resin and the SP value of KP-126 as the specific silicone is 7.7.

"Coefficient of dynamic friction-1" is a coefficient of dynamic friction of the outer peripheral surface of the endless belt measured by the procedure described in "Procedure of measuring coefficient of dynamic friction of outer peripheral surface of endless belt".

"Spray pressure" is a spray pressure at which all of polyester resin particles having adhered to the outer peripheral surface are spaced apart from the outer peripheral surface, in a case where polyester resin particles having a volume-average particle size of 4.7 μm are caused to adhere to the outer peripheral surface under a load of 0 $g/cm^2$, and then air is sprayed on the outer peripheral surface from above the outer peripheral surface at a spray pressure that is being increased.

"Coefficient of dynamic friction-2" is a coefficient of dynamic friction of the intermediate transfer member with respect to cleaning blade measured by the procedure described in "Procedure of measuring coefficient of dynamic friction of intermediate transfer member with respect to cleaning blade". That is, "Coefficient of dynamic friction-2" is a coefficient of dynamic friction obtained using the cleaning blade, which is mounted on the transfer device as a cleaning blade, in the measurement of the dynamic friction coefficient.

For Example 4, "Inevaluable due to occurrence of phase separation during preparation of belt" is written, which means that the endless belt cannot be prepared because the resin and the specific silicone are unlikely to be compatible with each other.

The above results tell that the endless belts of the present examples have excellent transferability and excellent cleanliness.

(((1))) An endless belt,
- wherein an outer peripheral surface of the endless belt has a coefficient of dynamic friction of 0.85 or less,
- and in a case where polyester resin particles having a volume-average particle size of 4.7 μm are caused to adhere to the outer peripheral surface under a load of 0 $g/cm^2$, and then air is sprayed on the outer peripheral surface from above the outer peripheral surface at a spray pressure that keeps increasing, all the polyester resin particles having adhered to the outer peripheral surface are spaced apart from the outer peripheral surface at the spray pressure of 6 kPa or less.

(((2))) The endless belt according to (((1))),
- comprising a layer containing a resin and silicone having a molecular weight of 5,000 or more and 40,000 or less.

(((3))) The endless belt according to (((2))),
- wherein a content of the silicone is 1.0% by mass or more with respect to a total mass of the layer.

(((4))) An endless belt comprising
- a layer containing a resin and silicone having a molecular weight of 5,000 or more and 40,000 or less,
- wherein an absolute value of a difference between an SP value of the resin and an SP value of the silicone is 4 or more and 8 or less.

(((5))) The endless belt according to (((4))),
- wherein the resin is an imide-based resin, and the silicone is polyether-modified polysiloxane.

(((6))) A transfer device comprising,
- an intermediate transfer member that has an outer peripheral surface to which a toner image is to be transferred and has the endless belt according to any one of (((1))) to (((5))),
- a primary transfer device that has a primary transfer member performing primary transfer of a toner image formed on a surface of an image holder to the outer peripheral surface of the intermediate transfer member,
- a secondary transfer device that has a secondary transfer member that is arranged in contact with the outer peripheral surface of the intermediate transfer member and performs secondary transfer of the toner image transferred to the outer peripheral surface of the intermediate transfer member to a surface of a recording medium, and
- a cleaning device that has a cleaning blade and brings the cleaning blade into contact with the intermediate transfer member to remove a residual toner.

(((7))) The transfer device according to (((6))), wherein a modulus of repulsion elasticity of a contact portion of the cleaning blade that comes into contact with the intermediate transfer member is 20% or more and 33% or less.

(((8))) The transfer device according to (((6))) or (((7))), wherein a coefficient of dynamic friction of the intermediate transfer member with respect to the cleaning blade is 0.6 or less.

(((9))) An image forming apparatus comprising a toner image forming device that has an image holder and forms a toner image on a surface of the image holder, and the transfer device according to any one of (((6))) to (((8))) that is a transfer device transferring the toner image formed on the surface of the image holder to a surface of a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An endless belt, comprising an outer peripheral surface layer, wherein at least the outer peripheral surface layer is constructed with a resin, and the resin contains silicone therein, wherein the outer peripheral surface layer of the endless belt has a coefficient of dynamic friction of 0.1 or more and 0.85 or less, and an absolute value of a difference between an SP value of the resin and an SP value of the silicone is 4 or more and 8 or less.

2. The endless belt according to claim 1, the silicone has a molecular weight of 5,000 or more and 40,000 or less.

3. The endless belt according to claim 2, wherein a content of the silicone is 1.0% by mass or more with respect to a total mass of the outer peripheral surface layer.

4. A transfer device comprising:

an intermediate transfer member that has an outer peripheral surface to which a toner image is to be transferred and has the endless belt according to claim 1;

a primary transfer device that has a primary transfer member performing primary transfer of a toner image formed on a surface of an image holder to the outer peripheral surface of the intermediate transfer member;

a secondary transfer device that has a secondary transfer member that is arranged in contact with the outer peripheral surface of the intermediate transfer member and performs secondary transfer of the toner image transferred to the outer peripheral surface of the intermediate transfer member to a surface of a recording medium; and a cleaning device that has a cleaning blade and brings the cleaning blade into contact with the intermediate transfer member to remove a residual toner.

5. The transfer device according to claim 4, wherein a modulus of repulsion elasticity of a contact portion of the cleaning blade that comes into contact with the intermediate transfer member is 20% or more and 33% or less.

6. The transfer device according to claim 4, wherein a coefficient of dynamic friction of the intermediate transfer member with respect to the cleaning blade is 0.6 or less.

7. An image forming apparatus comprising:

a toner image forming device that has an image holder and forms a toner image on a surface of the image holder; and the transfer device according to claim 6 that is a transfer device transferring the toner image formed on the surface of the image holder to a surface of a recording medium.

8. The endless belt according to claim 2, wherein a content of the silicone is 1.5% by mass or more and 3.0% by mass or less with respect to a total mass of the outer peripheral surface layer.

9. An endless belt comprising:

an outer peripheral surface layer containing a resin and silicone within the resin, wherein the silicone has a molecular weight of 5,000 or more and 40,000 or less, wherein an absolute value of a difference between an SP value of the resin and an SP value of the silicone is 4 or more and 8 or less.

10. The endless belt according to claim 9, wherein the resin is an imide-based resin, and the silicone is polyether-modified polysiloxane.

* * * * *